(12) United States Patent
Fong et al.

(10) Patent No.: US 8,209,362 B2
(45) Date of Patent: Jun. 26, 2012

(54) METHOD AND SYSTEM FOR MANAGING DATA FILES AND SCHEMAS

(75) Inventors: Nathan Fong, Seattle, WA (US); James R. Young, Jr., Marysville, WA (US); Henrik Steen, Kirkland, WA (US); Srinivasan Sudanagunta, Seattle, WA (US)

(73) Assignee: Disney Enterprises, Inc., Burbank, CA (US)

( * ) Notice: Subject to any disclaimer, the term of this patent is extended or adjusted under 35 U.S.C. 154(b) by 478 days.

(21) Appl. No.: 12/229,421

(22) Filed: Aug. 22, 2008

(65) Prior Publication Data

US 2010/0049732 A1 Feb. 25, 2010

(51) Int. Cl.
*G06F 7/00* (2006.01)
*G06F 17/30* (2006.01)

(52) U.S. Cl. ...................................... 707/809
(58) Field of Classification Search .................. 707/809, 707/999.1
See application file for complete search history.

(56) References Cited

U.S. PATENT DOCUMENTS

| 7,024,434 | B2 * | 4/2006 | Fuller et al. ............................ 1/1 |
| 7,299,237 | B1 * | 11/2007 | Clark et al. ............................ 1/1 |
| 2002/0099735 | A1 * | 7/2002 | Schroeder et al. ............ 707/513 |
| 2004/0194016 | A1 * | 9/2004 | Liggitt ...................... 715/501.1 |

* cited by examiner

*Primary Examiner* — Aleksandr Kerzhner
(74) *Attorney, Agent, or Firm* — Farjami & Farjami LLP

(57) ABSTRACT

There is provided a method of managing a plurality of data files using a plurality of schemas. The method comprises selecting a first schema from the plurality of schemas, determining current data files of the plurality of data files with respect to the first schema, identifying an outdated data file of the plurality of data files with respect to the first schema, selecting a transform file configured to transform the outdated data file into a current data file with respect to the first schema, transforming the outdated data file into a current data file with respect to the first schema by applying the transform file to the outdated data file. The method may further comprise validating the current data file against the first schema after transforming the outdated data file. The data files, schema, and transform file may comprise, respectively, an XML file, an XSD file, and an XSLT file.

16 Claims, 5 Drawing Sheets

METHOD AND SYSTEM FOR MANAGING DATA FILES AND SCHEMAS

BACKGROUND OF THE INVENTION

1. Field of the Invention

The present invention is generally in the field of computer technology. More particularly, the present invention relates to data management.

2. Background Art

Methods and systems for receiving, storing, and performing operations on data have matured significantly in the past several decades as the art of computer systems has advanced. For example, conventional computerized database systems routinely receive, store, and provide large amounts of data in various formats suitable for many purposes. Such purposes include, but are not limited to, electronic document handling, web page serving, Internet data services, and backup data storage. Several formats conventionally used for various types of data storage conform to the XML ("Extensible Markup Language") specification. These XML formats have various advantages. For example, data stored in an XML format is typically human readable, platform independent, and well-suited for document storage. Additionally, data stored in formats such as XML formats can be utilized by an enterprise in many ways.

Conventional methods and systems for database applications and other forms of data storage using formats such as XML formats typically suffer from several disadvantages. For example, in an enterprise that has a large collection of data in various formats in one or more databases, and that furthermore has a large collection of client services consuming the data, data management problems can become intractable. Such an enterprise may be required to stop operating various client or server services to allow conversion of data between various formats. Additionally, such an enterprise may experience operational slowdowns when performing multiple steps to complete data receptions, storage, and provision tasks contemporaneously.

Accordingly, there is a need to overcome the drawbacks and deficiencies in the art by offering an improved method and system for managing data files and schemas.

SUMMARY OF THE INVENTION

There are provided methods and systems for managing data files and schemas, substantially as shown in and/or described in connection with at least one of the figures, and as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention is directed to a method and system for managing data files and schemas. Although the invention is described with respect to specific embodiments, the principles of the invention, as defined by the claims appended herein, can obviously be applied beyond the specific embodiments of the invention described herein. Moreover, in the description of the present invention, certain details have been left out in order to not obscure the inventive aspects of the invention. The details left out are within the knowledge of a person of ordinary skill in the art. The drawings in the present application and their accompanying detailed description are directed to merely exemplary embodiments of the invention. To maintain brevity, other embodiments of the invention, which use the principles of the present invention are not specifically described in the present application and are not specifically illustrated by the present drawings.

Figure 1:
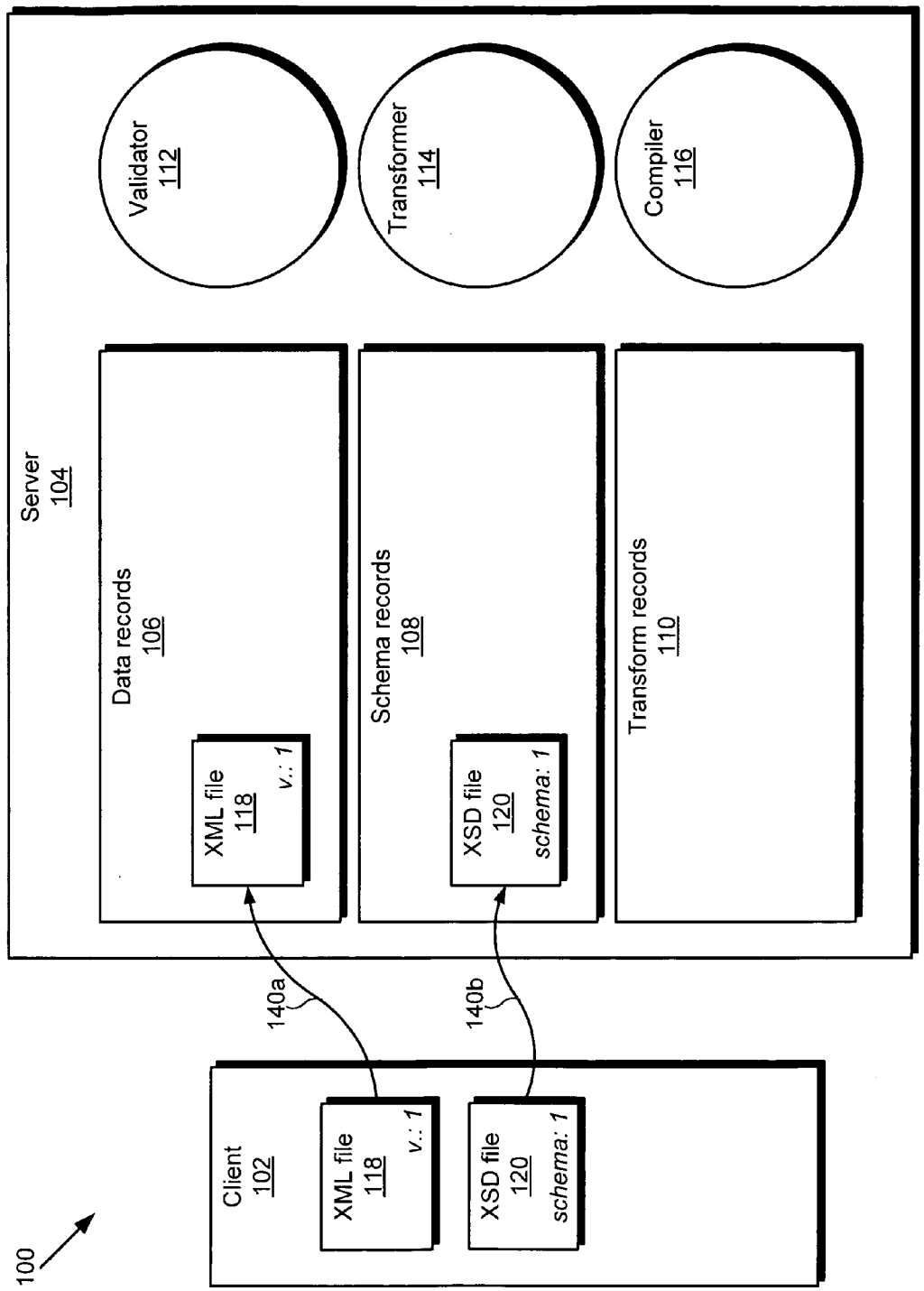
FIG. 1 shows a diagram of an exemplary system for managing data files and schemas, according to one embodiment of the present invention.

FIG. 1 shows exemplary system 100 according to one embodiment of the present invention. Server 104 of system 100 is configured in one embodiment to manage a plurality of data files using a plurality of schemas. System 100 comprises client 102 as well as server 104, and both client 102 and server 104 are implemented as, for example, a computer comprising a processor (not shown) and a memory (not shown) as known in the art, where the memory is capable of storing various algorithms for execution by the processor. Client 102 and server 104 are coupled for communication by, for example, a network such as the Internet. Client 102 may send and receive files to and from server 104 in several transactions (e.g. transaction 104a and transaction 104b) as discussed further below. Server 104 comprises data records 106, schema records 108, and transform records 110, as well as validator 112, transformer 114, and compiler 116.

In one embodiment, data records 106, schema records 108, and transform records 110 are implemented as regions of memory in the memory of server 104. In another embodiment, data records 106, schema records 108, and transform records 110 could be implemented as, for example, storage on a hard drive, or storage in one or more databases, as known in the art. Data records 106, schema records 108, and transform records 110 are configured to store files. For example, in FIG. 1, XML file 118 is stored in data records 106 after transaction 140a.

In one embodiment, validator 112, transformer 114, and compiler 116 are implemented as processes executing on the processor of server 104. In another embodiment, validator 112, transformer 114, and compiler 116 could be implemented as, for example, distributed processes executing on several processors of server 104, or remote processes executing on a remote server coupled to server 104 via a network, as known in the art. Validator 112, transformer 114, and compiler 116 are configured to validate, transform, and compile files stored in data records 106, schema records 108, and transform records 110, as described below.

XML file 118 is, in one embodiment, a file used for data storage by client 102 that conforms to the XML ("Extensible Markup Language") specification. In other embodiments, XML file 118 may conform to another markup language specification. XSD file 120 is, in one embodiment, a file used to represent a schema by client 102 that conforms to the XSD ("XML Schema Definition") specification. In other embodiments, XSD file 120 may conform to another schema definition specification. In the present embodiment, XSD file 120 represents schema version 1 (indicated as "schema: 1" of XSD file 120 in FIG. 1), and a validator (e.g. validator 112) may validate XML file 118 against XSD file 120 to determine whether XML file 118 conforms to schema version 1, in a transaction described further below. Notably, XML file 118, as shown in FIG. 1, is valid against schema version 1, as indicated by "v.: 1" of XML file 118.

Prior to transactions 140a and 140b, client 102 stores XML file 118 and XSD file 120, and server 104 does not yet have copies of XML file 118 and XSD file 120. Client 102 utilizes XML file 118 to represent, for example, a document such as a word processor document, a business presentation, a collection of statistical data, or a web page. Client 102 utilizes XSD file 120 to represent schema version 1 against which XML file 118 may be validated.

During transactions 140a and 140b, which in one embodiment are contemporaneous, XML file 118 and XSD file 120 are transferred to data records 106 and schema records 108, respectively, of server 104, and copies are not retained in client 102. After transactions 140a and 140b, further transactions may be performed in system 200 of FIG. 2, which corresponds substantially to system 100 of FIG. 1. In particular, client 202 and server 204 in FIG. 2 correspond to client 102 and server 104 in FIG. 1. Data records 206, schema records 208, transform records 210, validator 212, transformer 214, and compiler 216 of server 204 correspond to data records 106, schema records 108, transform records 110, validator 112, transformer 114, and compiler 116 of server 104. Furthermore, XSD file 220 stored in schema records 208 corresponds to XSD file 120 stored in schema records 108, and XML file 219 in data records 206 corresponds to XML file 118 in data records 106 except that XML file 219 has been transformed during transaction 244 to be valid against schema version 2, instead of schema version 1, as described further below.

Figure 2:
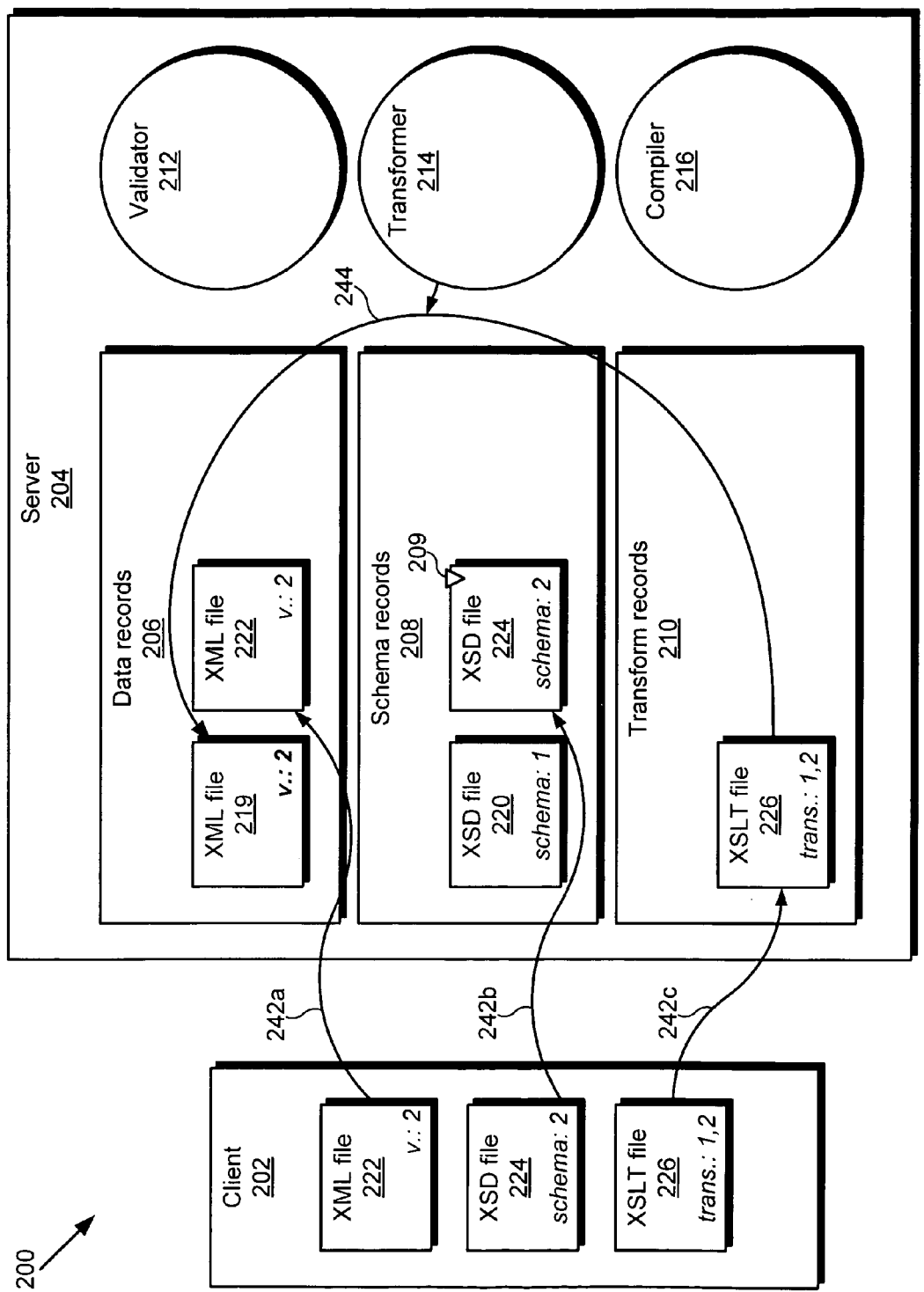
FIG. 2 shows a diagram of an exemplary system for managing data files and schemas, according to one embodiment of the present invention.

Several files are shown in FIG. 2 that are not shown in FIG. 1. Specifically, XML file 222, XSD file 224, and XSLT (Extensible Stylesheet Language Transformation) file 226 are introduced in FIG. 2. Prior to transactions 242a, 242b, and 242c, client 202 stores XML file 222, XSD file 224, and XSLT file 226, of which server 204 does not yet have copies. Client 202 utilizes XML file 222, like XML file 118, to represent, for example, a document or other data. Client 202 utilizes XSD file 224 to represent schema version 2, in a manner similar to how client 102 utilizes XSD file 120 to represent schema version 1. XSLT file 226 is utilized by server 204 to transform an XML file to be valid against a new schema. In the present embodiment, XSLT file 226 represents a transformation from schema version 1 to schema version 2 (indicated as "trans.: 1,2" of XSLT file 226 in FIG. 2), and a transformer (e.g. transformer 214) may transform XML file 118 utilizing XSLT file 226 into XML file 219, which conforms to schema version 2, in transaction 244 described further below. In one embodiment, XSLT file 226 also represents a transformation from schema version 2 to schema version 1. Thus, XSLT file 226 may represent a backward, a forward or a bi-directional transformation between schemas.

During transactions 242a, 242b, and 242c, which in one embodiment are contemporaneous, XML file 222, XSD file 224, and XSLT file 226 are transferred to data records 206, schema records 208, and transform records 210, respectively, of server 204, and copies are not retained in client 202. After transactions 242a, 242b, and 242c are performed, transformer 214 may initiate transaction 244 to transform XML file 118 into XML file 219 utilizing XSLT file 226. Transformer 214, which is in one embodiment a process executing on a processor of server 204, is specifically in one embodiment a background process that automatically transforms all XML files in data records 206 to validate against the most recently stored schema (e.g., against XSD file 224, representing schema version 2).

In one embodiment of the present invention, server 204 tracks an active schema version using active tag 209 in schema records 208. In such an embodiment, transformer 214 automatically transforms all XML files in data records 206 to validate against the active schema version (e.g. the XSD file indicated by active tag 209), instead of against the most recently stored schema. Active tag 209 may be configured to indicate an XSD file as representing the active schema version when, for example, the XSD file is stored in schema records 208, or alternatively when, for example, client 202 performs a transaction to manually set active tag 209.

Figure 3:
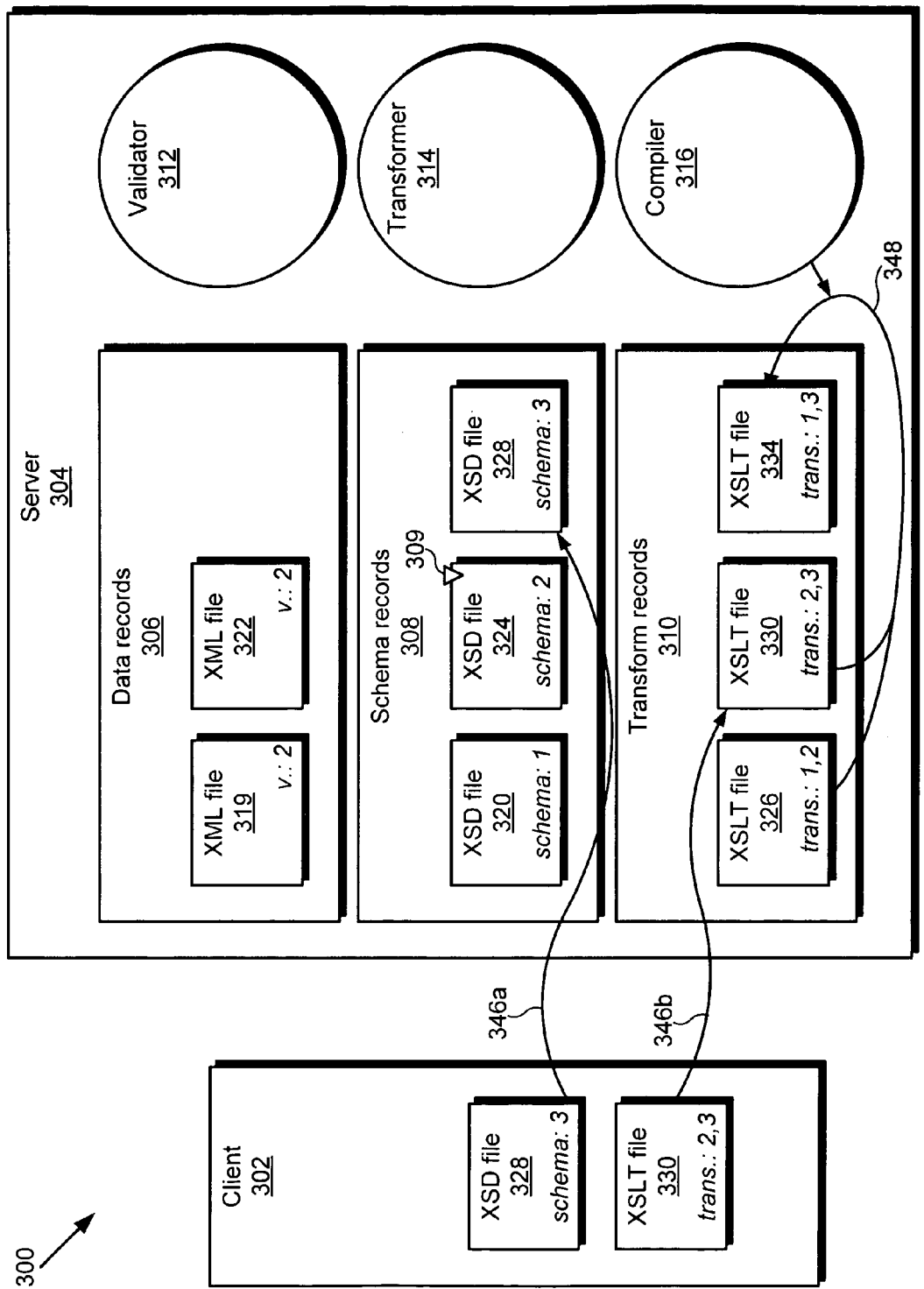
FIG. 3 shows a diagram of an exemplary system for managing data files and schemas, according to one embodiment of the present invention.

After transactions 242a, 242b, 242c, and 244, further transactions may be performed in system 300 of FIG. 3, which corresponds substantially to system 200 of FIG. 2. In particular, client 302 and server 304 in FIG. 3 correspond to client 202 and server 204 in FIG. 2. Data records 306, schema records 308, transform records 310, validator 312, transformer 314, and compiler 316 of server 304 correspond to data records 206, schema records 208, transform records 210, validator 212, transformer 214, and compiler 216 of server 204. Furthermore, XSD files 320 and 324 stored in schema records 308 correspond to XSD files 220 and 224 stored in schema records 208, XML files 319 and 322 in data records 306 correspond to XML files 219 and 222 in data records 206, and XSLT file 326 in transform records 310 corresponds to XSLT file 226 in transform records 210. Active tag 309 corresponds to active tag 209 and indicates XSD file 324, notwithstanding the storage of XSD file 328 during transaction 346a, as discussed further below.

Several files are shown in FIG. 3 that are not shown in FIG. 2. Specifically, XSD file 328, XSLT file 330, and XSLT file 334 are introduced in FIG. 3. Prior to transactions 346a and 346b, client 302 stores XSD file 328 and XSLT file 330, of which server 304 does not yet have copies. Client 202 utilizes XSD file 328 to represent schema version 3, in a manner similar to how client 202 utilizes XSD file 224 to represent schema version 2. XSLT file 330 is utilized by server 304 to transform an XML file to be valid against a new schema. In the present embodiment, XSLT file 330 represents a transformation from schema version 2 to schema version 3 (indicated as "trans.: 2,3" of XSLT file 330 in FIG. 3). In one embodiment, XSLT file 330 also represents a transformation from schema version 3 to schema version 2. Thus, XSLT file 330 may represent a backward, a forward or a bi-directional transformation between schemas.

During transactions 346a and 346b, which in one embodiment are contemporaneous, XSD file 328 and XSLT file 330 are transferred to schema records 308 and transform records 310, respectively, of server 304, and copies are not retained in client 202. After transactions 346a and 346b are performed, active tag 309 is configured, in one embodiment, to continue indicating XSD file 324. Additionally, compiler 316 initiates transaction 348 to compile XSLT files 326 and 330 into XSLT file 334. Compiler 316, which is in one embodiment a process executing on a processor of server 304, is specifically in one embodiment a background process that automatically compiles sets of XSLT files in transform records 310 to produce reduced length, or more efficient transforms between valid XML files. In FIG. 3, XSLT file 334 represents a transformation from schema version 1 to schema version 3 (indicated as "trans.: 1,3" of XSLT file 334 in FIG. 3). In one embodiment, XSLT file 334 also represents a transformation from schema version 3 to schema version 1. Thus, XSLT file 334 may represent a backward, a forward or a bi-directional transformation between schemas. By thus compiling XSLT file 334, compiler 316 has, for example, relieved transformer 314 of a subsequent burden—instead of utilizing XSLT files 326 and 330 to transform an XML file from schema version 1 to 3, transformer 314 may simply and more efficiently use only XSLT file 334.

Figure 4:
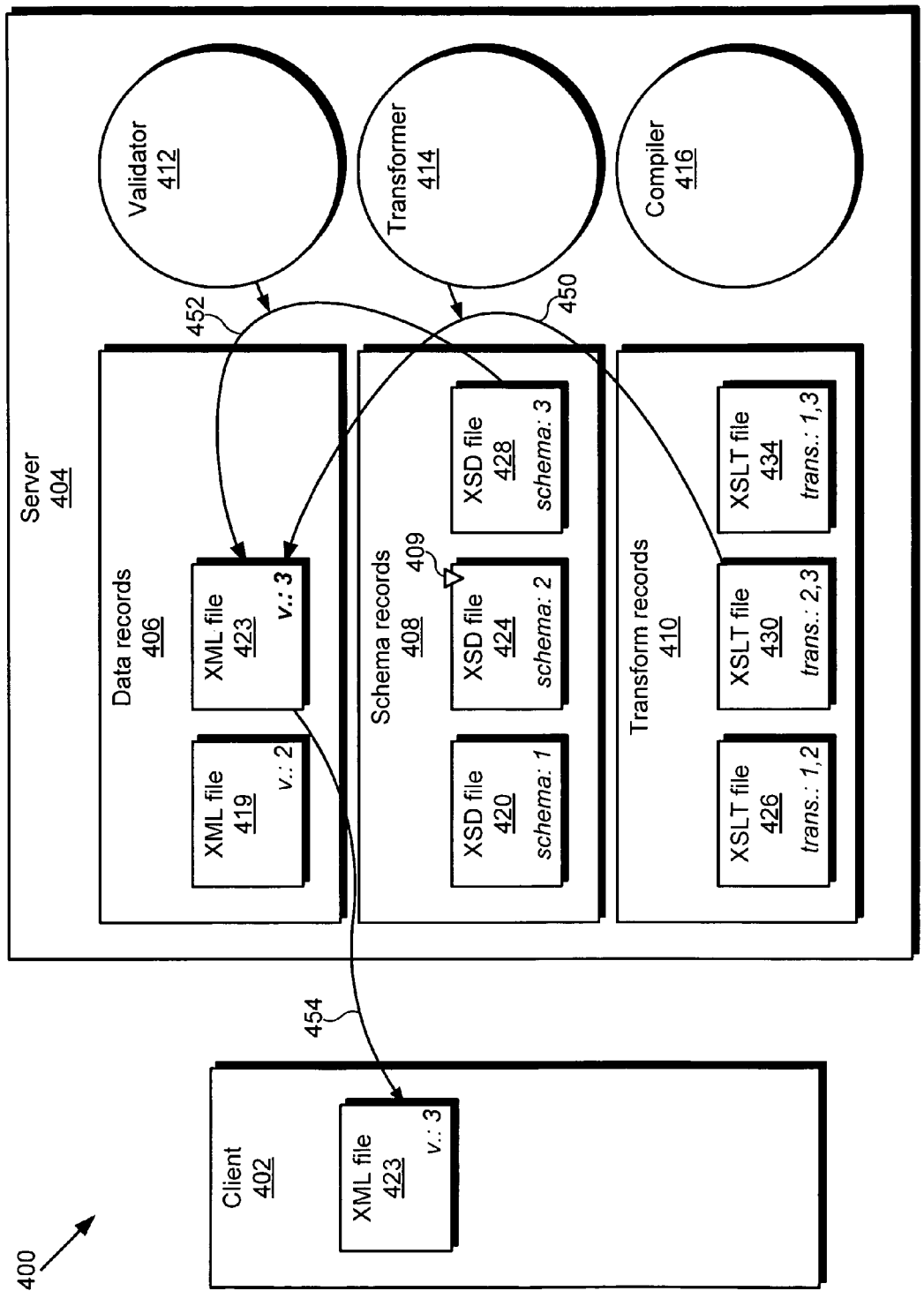
FIG. 4 shows a diagram of an exemplary system for managing data files and schemas, according to one embodiment of the present invention.

After transactions 346*a*, 346*b*, and 348, further transactions may be performed in system 400 of FIG. 4, which corresponds substantially to system 300 of FIG. 3. In particular, client 402 and server 404 in FIG. 4 correspond to client 302 and server 304 in FIG. 3. Data records 406, schema records 408, transform records 410, validator 412, transformer 414, and compiler 416 of server 404 correspond to data records 306, schema records 308, transform records 310, validator 312, transformer 314, and compiler 316 of server 304. Furthermore, XML file 419 in data records 406 corresponds to XML file 319 in data records 306, XSD files 420, 424, and 428 stored in schema records 408 correspond to XSD files 320, 324, and 328 stored in schema records 308, and XSLT files 426, 430, and 434 in transform records 410 correspond to XSLT files 326, 330, and 334 in transform records 310. Active tag 409 corresponds to active tag 309 and continues to indicate XSD file 424, for example, while XML file 423 in data records 406 corresponds to XML file 322 in data records 306 except that XML file 423 has been transformed during transaction 450 to be valid against schema version 3, instead of schema version 2, as described further below.

As discussed above in FIGS. 1, 2, and 3, client 402 (i.e. clients 102, 202, and 302) performs transactions that cause various XML, XSD, and XSLT files to be stored in server 404. In contrast, in FIG. 4 client 402 causes an XML file (e.g. XML file 423) to be transferred from server 404 to client 402 in transaction 454. Prior to transaction 454, client 402 sends a request message (not shown) to server 404 requesting a copy of XML file 322 that is valid against schema version 3. Because XML file 322 is valid against schema version 2, instead of schema version 3, server 404 performs several transactions (e.g. transactions 450 and 452) prior to complying.

Pursuant to the request message of client 402, transformer 414 may initiate transaction 450 to transform XML file 322 into XML file 423 utilizing XSLT file 430. Transformer 414, which is in one embodiment a process executing on a processor of server 404, is specifically in one embodiment a client-driven process that transforms an XML file in data records 406 to validate against a requested schema (e.g., against XSD file 428, representing schema version 3). After transaction 450, but prior to transaction 454, validator 412 may initiate transaction 452 to validate XML file 423 against XSD file 428. Validator 412, which is in one embodiment a process executing on a processor of server 404, is specifically in one embodiment a client-driven process that validates an XML file in data records 406 against a requested schema subsequent to transformation. Thus, in one embodiment, validator 412 performs an error-checking or quality-assurance function on an XML file prior to sending the XML file to client 402. In one embodiment, after transactions 450 and 452, XML file 423, having been transformed and validated, is transferred from server 404 to client 402.

Figure 5:
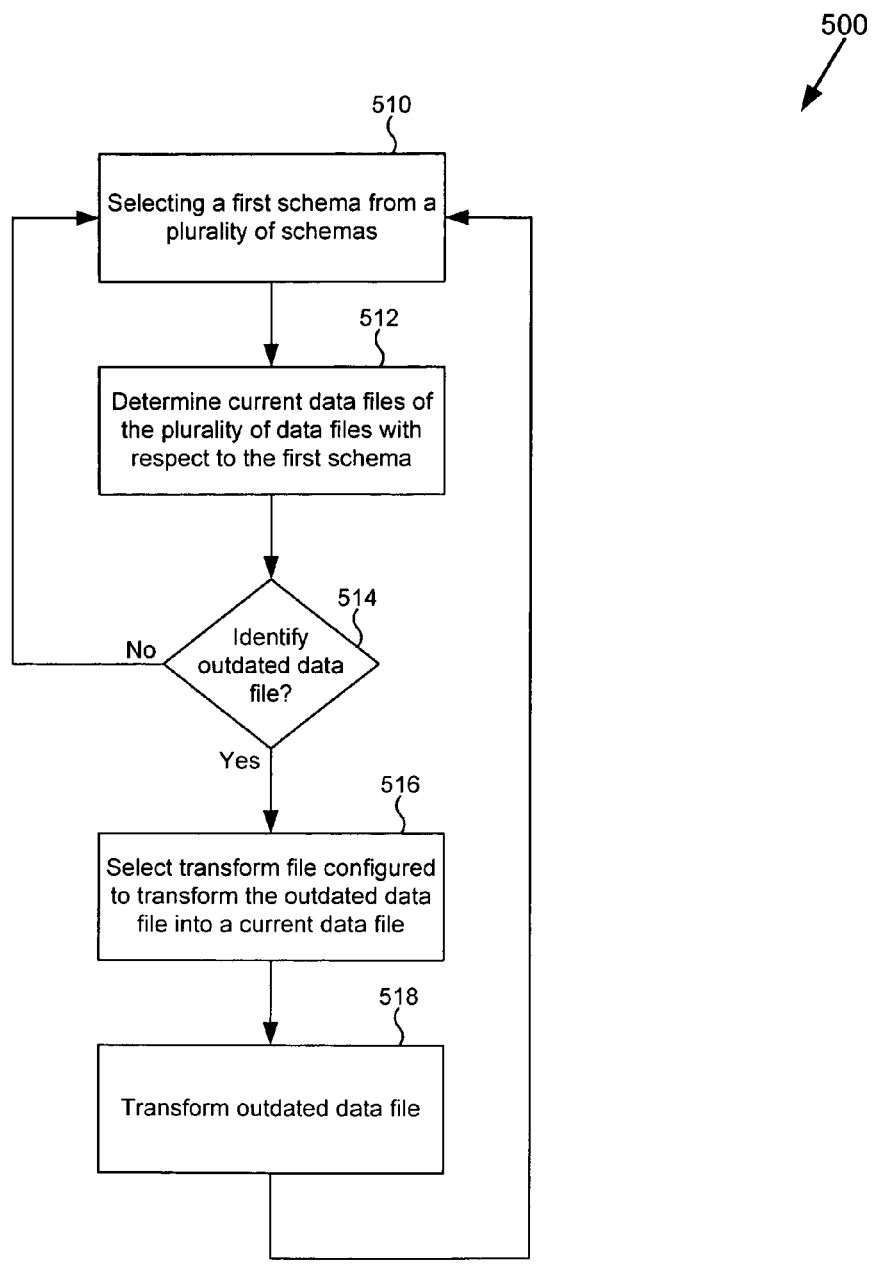
FIG. 5 shows a flowchart presenting an exemplary method for managing data files and schemas, according to one embodiment of the present invention.

FIG. 5 shows flowchart 500 of an exemplary method for managing a plurality of data files using a plurality of schemas, according to one embodiment of the present invention. Certain details and features have been left out of flowchart 500 that are apparent to a person of ordinary skill in the art. For example, a step may comprise one or more substeps or may involve specialized equipment or materials, as known in the art. While steps 510 through 518 indicated in flowchart 500 are sufficient to describe one embodiment of the present invention, other embodiments of the invention may utilize steps different from those shown in flowchart 500.

In step 510 of flowchart 500, a first schema, for example XSD file 428 in FIG. 4, is selected by a client, such as client 402, from a plurality of schemas, such as those stored in schema records 408. The plurality of schemas is stored, in one embodiment, in a server corresponding to server 404. The client selects the first schema by, for example, sending a request message to the server. The request message also includes, in one embodiment, a particular data file to be returned by the server to the client. The first schema selected by the client represents, for example, schema version 3 of a variety of different schema versions. In one embodiment, the first schema can be utilized by a validator corresponding to validator 412 to validate an XML file.

In step 512 of flowchart 500, the server determines current data files in a plurality of data files, such as those stored in data records 406, with respect to the first schema selected in step 510. The server performs this determination by examining each data file in the plurality of data files and noting which schema version each data file should validate against. For example, in FIG. 1, XML file 118 should validate against schema version 1, and in FIG. 3 XML file 322 should validate against schema version 2.

In step 514 of flowchart 500, the server identifies an outdated data file of the plurality of data files with respect to the first schema selected in step 512. In one embodiment, the outdated data file is valid against a higher schema of the plurality of schemas with respect to the first schema, while in another embodiment the outdated data file is valid against a lower schema of the plurality of schemas with respect to the first schema. In another embodiment, for example an embodiment in which the server is utilizing a background process to keep data files validated against an active schema indicated by an active tag, the server will identify as outdated every data file that did not validate against the first schema. In yet another embodiment, in which the server is responding to a request message from a client to return a file from the server to the client, the server may identify as outdated only the data file to be returned, if that data file does not validate against the schema version included in the request message. If the server does not identify any outdated data files, it may, for example, transmit a requested data file to the client and return to step 510, as shown in FIG. 5. Alternatively, if the server does identify an outdated data file, flowchart 500 proceeds to step 516.

In step 516 of flowchart 500, the server selects a transform file, corresponding to a transform file stored in transform records 410, configured to transform the identified outdated data file into a current data file with respect to the first schema. In one embodiment, the transform file may represent a backward, a forward or a bi-directional transformation between schemas. In another embodiment, the transform file may represent a unidirectional transformation to a higher or lower schema version. The selected transform file may be, for example, a transform file provided previously by the client at the same time the client provided a new schema version file (e.g., may correspond to XSLT file 430). Alternatively, the selected transform file may be, for example, a transform file compiled by a compiler (e.g. compiler 416) executing as a background process (e.g., may correspond to XSLT file 434).

In step 518 of flowchart 500, the server transforms the outdated data file into a current data file with respect to the first schema by applying the transform file to the outdated file. For example, a transformer executing on a processor of the server can apply a transform file corresponding to XSLT file 430 to an outdated data file corresponding to XML file 322 to produce a current data file corresponding to XML file 423, which is valid against the first schema selected in step 510. After transforming the outdated data file, a validator corresponding to validator 412 may validate the transformed current data file against the first schema. Finally, the server may transmit the transformed current data file to the client and return to step 510.

In the manner described above, in some embodiments, the present invention as shown in exemplary systems 100, 200, 300, and 400 as well as exemplary flowchart 500 achieves improved managing of a plurality of data files using a plurality of schemas while overcoming the drawbacks of conventional solutions. In one embodiment, data files, transform files, and schemas are managed and stored in a server as described above, thereby providing for improved handling of different schemas and transformation of data files between different schemas, for example. The drawbacks of conventional solutions, which include intractable management issues leading to slowdowns or even stoppages, for example, are avoided.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of managing a plurality of data files using a plurality of schemas, the method comprising:
    selecting a first schema from the plurality of schemas, wherein the plurality of schemas include XML Schema Definition (XSD) files;
    determining current data files of the plurality of data files with respect to the first schema, wherein the plurality of data files include Extensible Markup Language (XML) files;
    identifying an outdated data file of the plurality of data files with respect to the first schema;
    selecting a transform file configured to transform the outdated data file into a current data file with respect to the first schema, wherein the selecting of the transform file comprises compiling a plurality of transform files into the transform file, wherein the plurality of transform files include Extensible Stylesheet Language Transformations (XSLT) files; and
    transforming the outdated data file into the current data file with respect to the first schema by applying the transform file to the outdated data file.

2. The method of claim 1, wherein selecting the first schema comprises indicating the first schema with an active tag.

3. The method of claim 1, wherein determining the current data files comprises comparing the plurality of data files to the first schema.

4. The method of claim 1, wherein identifying the outdated data file comprises comparing the plurality of data files to the first schema.

5. The method of claim 1, wherein transforming the outdated data file comprises replacing the outdated data file with the current data file.

6. The method of claim 1, further comprising validating the current data file against the first schema after transforming the outdated data file.

7. The method of claim 1, wherein the transform file represents one of a backward transformation, a forward transformation, and a bi-directional transformation between two or more of the plurality of schemas.

8. A system for managing a plurality of data files using a plurality of schemas, the system comprising:
    a memory;
    a processor, wherein the processor is configured to:
    select a first schema from the plurality of schemas, wherein the plurality of schemas include XML Schema Definition (XSD) files;
    determine current data files of the plurality of data files with respect to the first schema, wherein the plurality of data files include Extensible Markup Language (XML) files;
    identify an outdated data file of the plurality of data files with respect to the first schema;
    select a transform file configured to transform the outdated data file into a current data file with respect to file first schema, wherein the processor is configured to select the transform file by compiling a plurality of transform files into the transform file, wherein the plurality of transform files include Extensible Stylesheet Language Transformations (XSLT) files; and
    transform the outdated data file into a current data file with respect to the first schema by applying the transform file to the outdated data file.

9. The system of claim 8, wherein the processor is configured to select the first schema by indicating the first schema with an active tag.

10. The system of claim 8, wherein the processor is configured to determine the current data files by comparing the plurality of data files to the first schema.

11. The system of claim 8, wherein the processor is configured to identify the outdated data file by comparing the plurality of data files to the first schema.

12. The system of claim 8, wherein the processor is configured to transform the outdated data file by replacing the outdated data file with the current data file.

13. The system of claim 8, wherein the processor is further configured to validate the current data file against the first schema after transforming the outdated data file.

14. The system of claim 8, wherein the outdated data file is valid against a higher schema version of the plurality of schemas with respect to the first schema.

15. The system of claim 8, wherein the outdated data file is valid against a lower schema version of the plurality of schemas with respect to the first schema.

16. The system of claim 8, wherein the transform file represents one of a backward transformation, a forward transformation, and a bi-directional transformation between two or more of the plurality of schemas.

* * * * *

UNITED STATES PATENT AND TRADEMARK OFFICE
CERTIFICATE OF CORRECTION

| | | |
|---|---|---|
| PATENT NO. | : 8,209,362 B2 | Page 1 of 1 |
| APPLICATION NO. | : 12/229421 | |
| DATED | : June 26, 2012 | |
| INVENTOR(S) | : Fong et al. | |

It is certified that error appears in the above-identified patent and that said Letters Patent is hereby corrected as shown below:

In the claims, column 8, line 31, "file" should be changed to --the--.

Signed and Sealed this
Twenty-fifth Day of September, 2012

David J. Kappos
*Director of the United States Patent and Trademark Office*